(12) United States Patent
Hashemzadeh et al.

(10) Patent No.: US 11,421,062 B2
(45) Date of Patent: Aug. 23, 2022

(54) COMPOSITE HEAT INSULATION SYSTEM

(71) Applicant: WACKER CHEMIE AG, Munich (DE)

(72) Inventors: Abdulmajid Hashemzadeh, Burghausen (DE); Peter Asbeck, Burghausen (DE); Holger Bienerth, Munich (DE); Harald Zeh, Burghausen (DE)

(73) Assignee: WACKER CHEMIE AG, Munich (DE)

( * ) Notice: Subject to any disclaimer, the term of this patent is extended or adjusted under 35 U.S.C. 154(b) by 417 days.

(21) Appl. No.: 16/326,328

(22) PCT Filed: Aug. 19, 2016

(86) PCT No.: PCT/EP2016/069715
§ 371 (c)(1),
(2) Date: Feb. 18, 2019

(87) PCT Pub. No.: WO2018/033218
PCT Pub. Date: Feb. 22, 2018

(65) Prior Publication Data
US 2019/0210933 A1 Jul. 11, 2019

(51) Int. Cl.
| | |
|---|---|
| *C04B 41/63* | (2006.01) |
| *C04B 26/06* | (2006.01) |
| *C04B 28/26* | (2006.01) |
| *C04B 28/02* | (2006.01) |
| *C04B 14/06* | (2006.01) |
| *C04B 14/30* | (2006.01) |
| *C04B 40/00* | (2006.01) |
| *C09D 7/61* | (2018.01) |
| *C09D 127/06* | (2006.01) |
| *C08K 3/26* | (2006.01) |
| *C08K 3/36* | (2006.01) |
| *C08F 214/06* | (2006.01) |
| *C08F 220/18* | (2006.01) |
| *C04B 41/48* | (2006.01) |
| *C09D 133/06* | (2006.01) |
| *E04B 1/76* | (2006.01) |
| *E04F 13/04* | (2006.01) |
| *C04B 111/00* | (2006.01) |
| *C04B 111/28* | (2006.01) |
| *E04F 13/02* | (2006.01) |

(52) U.S. Cl.
CPC ........ *C08F 220/1804* (2020.02); *C04B 26/06* (2013.01); *C04B 28/02* (2013.01); *C04B 28/26* (2013.01); *C04B 40/0039* (2013.01); *C04B 41/483* (2013.01); *C04B 41/4838* (2013.01); *C04B 41/63* (2013.01); *C08F 214/06* (2013.01); *C08K 3/26* (2013.01); *C08K 3/36* (2013.01); *C09D 7/61* (2018.01); *C09D 127/06* (2013.01); *C09D 133/062* (2013.01); *E04B 1/7625* (2013.01); *E04F 13/047* (2013.01); *C04B 2111/00612* (2013.01); *C04B 2111/00637* (2013.01); *C04B 2111/28* (2013.01); *C04B 2201/30* (2013.01); *C08F 2800/20* (2013.01); *C08K 2003/265* (2013.01); *E04B 1/762* (2013.01); *E04F 13/02* (2013.01); *Y02W 30/91* (2015.05)

(58) Field of Classification Search
None
See application file for complete search history.

(56) References Cited

U.S. PATENT DOCUMENTS

| | | | |
|---|---|---|---|
| 8,871,844 B2 * | 10/2014 | Hashemzadeh | C09C 1/3072 524/262 |
| 2004/0077768 A1 | 4/2004 | Greenwood | |
| 2004/0171728 A1 | 9/2004 | Xue et al. | |
| 2005/0025952 A1 | 2/2005 | Field et al. | |
| 2008/0098933 A1 | 5/2008 | Killat | |
| 2010/0144925 A1 | 6/2010 | Cabrera et al. | |
| 2011/0015340 A1 | 1/2011 | Hashemzadeh | |
| 2011/0256786 A1 * | 10/2011 | Bomberg | E04B 1/625 442/1 |
| 2013/0062549 A1 | 3/2013 | Angenendt et al. | |
| 2013/0071640 A1 | 3/2013 | Szillat | |
| 2013/0337266 A1 | 12/2013 | Hashemzadeh | |

(Continued)

FOREIGN PATENT DOCUMENTS

| | | |
|---|---|---|
| CN | 1668871 A | 9/2005 |
| CN | 104093778 A | 10/2014 |
| DE | 2516916 A1 | 10/1976 |

(Continued)

OTHER PUBLICATIONS

English abstract for DE 2516916 A1.
English abstract for DE 4216204 A1.
English abstract for WO 2012/022667 A1.
English abstract for EP 2998367 A1.
English abstract for EP 2871169 A1.
English abstract for DE 102010048174 A1.
English abstact for EP 2762522 A1.
Ullmann's Encyclopedia of Industrial Chemistry, vol. A 23, pp. 583 bis 660, Verlag Chemie, Weinheim, 1992.
E. Matijevic, Chem. Mater. 1993, pp. 412-426.

(Continued)

Primary Examiner — Sheeba Ahmed
(74) Attorney, Agent, or Firm — Brooks Kushman P.C.

(57) ABSTRACT

The invention relates to a composite heat insulation system, comprising an insulating layer, optionally a reinforcing layer, which is applied to the insulating layer, and a cover layer, which is applied to the insulating layer or, if present, to the reinforcing layer, characterized in that the cover layer contains composite particles, wherein the composite particles contain at least one organic polymer and at least one inorganic solid, wherein the weight percentage of inorganic solid is 15 to 40 wt %, with respect to the total weight of organic polymer and inorganic solid in the composite particle.

11 Claims, No Drawings

(56) References Cited

U.S. PATENT DOCUMENTS

2014/0243457 A1 8/2014 Koehler et al.
2015/0315374 A1 11/2015 Hashemzadeh

FOREIGN PATENT DOCUMENTS

| | | | |
|---|---|---|---|
| DE | 4216204 | A1 | 11/1993 |
| DE | 102006050336 | A1 | 5/2008 |
| DE | 102010009146 | A1 | 8/2011 |
| DE | 102010048174 | A1 | 4/2012 |
| DE | 102012223620 | A1 | 6/2014 |
| EP | 2059571 | B1 | 11/2010 |
| EP | 2762522 | A1 | 8/2014 |
| EP | 2671169 | A1 | 5/2015 |
| EP | 2998367 | A1 | 3/2016 |
| KR | 20030029419 | A | 4/2003 |
| KR | 20160057531 | A | 5/2016 |
| WO | 03000760 | A1 | 1/2003 |
| WO | 04035474 | A1 | 4/2004 |
| WO | 09112370 | A1 | 9/2009 |
| WO | 11150987 | A1 | 12/2011 |
| WO | 12022667 | A1 | 2/2012 |
| WO | 12110618 | A1 | 8/2012 |

OTHER PUBLICATIONS

Encycl. Polymer Science a. Engineering, Second Ed., vol. 8, pp. 659-677.
Fox T. G. Bull Am Physics Soc, p. 123 (1956).
Polymer Handbook 2nd Edition (1975), J. Wiley and Sons.
Mowilith Nano 9420 Product Information, Celanese Emulsion Polymers, Version 1—Issue 2009/03, 4 pages.
Mowilith Nano 9420 Technical Data Sheet, Celanese Emulsion Polymers, Version 1—Issue 2009/03, 2 pages.
Krieger et al, "Colloidal Silica Latex Polymer Nanocomposites for High Performance Coatings", JCT Coatings Tech, Aug. 2008, pp. 26-30.
ThermoSan facade plasters, Technical information, No. 628, CAPAROL, Dec. 2014, 5 pages.
Edition Carbon Brochure, CAPAROL, Aug. 2011, pp. 1-15.
European Technical Approval, DIBT, ETA-09/0368, pp. 1-15.
Recipe for ThermoSan facade plasters dated Sep. 10, 2012.
General technical building approval, DIBt, 21 pages.
ETICS Manual, Application Instructions and technical information, 2015, 12 pages.
Technical data sheet Mowilith Nano 9450, Celanese Emulsion Polymers, Aug. 13, 2013, 11 pages.

\* cited by examiner

COMPOSITE HEAT INSULATION SYSTEM

CROSS-REFERENCE TO RELATED APPLICATIONS

This application is a U.S. National Phase Application of PCT/EP2016/069715, filed Aug. 19, 2016 the contents of which are incorporated herein by reference in their entireties for all purposes.

FIELD OF THE INVENTION

The invention relates to an external thermal insulation composite system and to a method for producing an external thermal insulation composite system.

BACKGROUND OF THE INVENTION

For the construction of external thermal insulation composite systems (ETICS), insulation boards, for example rigid foam boards or glass- or rock-wool boards, are conventionally fixed to the masonry using adhesive mortar. There is then applied to the insulation boards a reinforcing layer, into which reinforcing fabric, mostly glass fiber fabric, is inserted. Finally, the composite system is covered with a finishing render (top render).

Accordingly, DE OS 2516916 describes an external thermal insulation composite system in which the façade is clad with rigid polystyrene foam boards which are rendered with a cement mortar. DE 42 16 204 A1 describes the thermal insulation of buildings using mineral insulation boards made of calcium silicate, silicon dioxide and a porous additive. This thermal insulation is covered on the outside with a render layer, wherein a woven fabric is embedded between the thermal insulation boards and the render layer. This finishing render can also comprise fiber materials or polymers as adhesion improvers.

In the case of finishing renders, a distinction can be made between four systems: mineral renders, silicate renders, synthetic resin renders and silicone resin renders. Mineral renders, which are generally applied in two layers, are also referred to as thick-layer systems, while the relatively thin silicate renders, synthetic resin renders and silicone resin renders are known as thin-layer systems. Thin-layer systems have established themselves most widely on the market since they shrink only slightly and are easy and economical to process because their final strength is achieved relatively quickly. In these thin-layer systems, the layer thicknesses are between 2 and 5 mm. In these thin-layer systems in particular, problems can arise because of their law resistance to mechanical loads, such as blows with sharp objects or hail impact. In the case of polymer-bonded systems in particular, such as silicone renders or synthetic resin renders, problems concerning fire protection are at the forefront, in the event of fire, pronounced heat and smoke formation can occur, and the finishing render can be damaged by melting of the organic binders and may even drip off. The top render thus loses its fire protection function and its barrier function for the rigid polystyrene foam boards.

BRIEF SUMMARY OF THE INVENTION

Accordingly, the object was to improve such external thermal insulation composite systems comprising an insulating layer of insulation boards and a finishing layer applied thereto so that they exhibit high mechanical resilience (impact protection) and form a stable barrier even in the event of fire, in particular while retaining their impact protection.

Surprisingly, it has been possible to solve those problems by means of composite particles in the finishing render.

DETAILED DESCRIPTION OF PREFERRED EMBODIMENTS

The invention provides an external thermal insulation composite system comprising an insulating layer, optionally a reinforcing layer applied to the insulating layer, and a finishing layer applied to the insulating layer or optionally to the reinforcing layer, characterized in that the finishing layer comprises composite particles, wherein the composite particles comprise at least one organic polymer and at least one inorganic solid, wherein the amount by weight of inorganic solid is from 15 to 40% by weight, based on the total weight of organic polymer and inorganic solid in the composite particle.

Composite particles are prior art and are available commercially and can be in the form of aqueous dispersions or in the form of water-dispersible polymer powders, WO 03/000760 A1 relates to a method for producing a composite particle dispersion of inorganic solid particles and organic polymerizate by means of polymerization of a monomer mixture, which comprises silicon-functional monomer in small amounts, in the presence of a dispersion of inorganic solid particles. The products thereby obtained are recommended as binders for coatings, adhesives and mortar compositions. From WO 2004/035474 A1 there are known aqueous composite particle dispersions which are obtained by mixing aqueous dispersions of silanized silica particles with aqueous polymer dispersions. The products are recommended as binders for coating compositions and cementitious mortar formulations. WO 2009/112370 A1 describes a method for producing a composite particle dispersion by means of condensation of one or more alkoxysilanes in an aqueous polymer dispersion which has been rendered basic. Alternatively, a silica sol can be prepared separately by means of condensation of alkoxysilane and then mixed with an aqueous polymer dispersion. Recommended applications are coating compositions and adhesives. WO 2012/110618 A1 relates to a method for producing modified composite particles by mixing an aqueous polymer dispersion and an aqueous silica sol and then polymerizing monomers in that mixture. Described applications are those already mentioned above. WO 2012/02667 A1 describes the production of composite particle dispersions by means of polymerization of ethylenically unsaturated monomers in the presence of inorganic solids dispersedly distributed in water, wherein, in order to improve the storage stability of the dispersion thereby obtained, epoxysilane is added during or after the polymerization.

Composite particles comprise an organic polymer phase and finely divided, inorganic solid particles distributed therein, which solid particles are linked to the polymer chains of the organic; polymer phase preferably via physical bonds (for example via carboxyl-functional monomer units in the polymer) or via chemical bonds (for example via silicon-functional monomer units in the polymer).

Preferred finely divided, inorganic solid particles are metal oxides or semi-metal oxides. Preferably having a particle size of the solid particles dispersed in water of from 4 to 150 nm, particularly preferably from 5 to 100 nm. The particle size is the weight-average particle size $d_w$, determined by means of statistical light, scattering measurement, for example using a Nanosizer from Coulter.

Suitable metal oxides are, for example, the oxides of titanium, zirconium, aluminum, barium, magnesium or iron. Such metal oxides are available commercially, for example titanium dioxide, zirconium(IV) oxide, tin(II) oxide, tin(IV) oxide, aluminum oxide, hydroxyaluminum oxide, barium; oxide, magnesium oxide, iron(II) oxide, iron(III) oxide, iron(II/III) oxide. Silicon dioxide may be mentioned as the preferred semi-metal oxide. Silicon dioxide can be in amorphous form and/or in different crystalline structures. Silicon dioxide can be, for example, in the form of water glass or silica sols. Suitable silicon dioxide is also known under the trade names Aerosil®, Nalco®, Levasil®, Ludox®, Nyacol®, Bindzil® and Snowtex®. Particular preference is given to silica sols and silica sols modified with aluminate or epoxysilane. For the production of the modified silica sols, either an aqueous aluminate solution, for example $NaAl(OH)_4$, or an epoxysilane, for example 3-glycidyloxypropyltrimethoxysilane, is added, with stirring and optionally while heating, to a conventional silica sol.

The preparation of the finely divided inorganic solids is known to the person skilled in the art and is carried out, for example, by precipitation reactions or chemical reactions in the gas phase (see in this connection E. Matijevic, Chem. Mater, 1993, 5, pages 412 to 426; Ullmann's Encyclopedia of Industrial Chemistry, Vol. A 23, pages 583 to 660, Verlag Chemie, Weinheim, 1992).

Suitable ethylenically unsaturated monomers for the preparation of the aqueous dispersion of the organic polymer are vinyl esters of unbranched or branched alkylcarboxylic acids having from 1 to 15 carbon atoms, methacrylic acid esters and acrylic acid esters of alcohols having from 1 to 15 carbon atoms, vinyl aromatic compounds, olefins, dienes or vinyl halides. Preferred vinyl esters are vinyl acetate, vinyl propionate, vinyl butyrate, vinyl 2-ethylhexanoate, vinyl laurate, 1-methyl-vinyl acetate, vinyl pivalate and vinyl esters of alpha-branched monocarboxylic acids having from 9 to 13 carbon atoms, for example Veova9® or VeoVa10® (trade names of Momentive). Particular preference is given to vinyl acetate. Preferred methacrylic acid esters or acrylic acid esters are methyl acrylate, methyl methacrylate, ethyl acrylate, ethyl methacylate, propyl acrylate, propyl methacrylate, n-butyl acrylate, n-butyl methacrylate, 2-ethylhexyl acrylate, norbornyl acrylate. Particular preference is given to methyl acrylate, methyl methacrylate, n-butyl acrylate and 2-ethylhexyl acrylate. Examples of olefins and dienes are ethylene, propylene and 1,3-butadiene. Suitable vinyl aromatic compounds are styrene and vinyltoluene. A preferred vinyl halide is vinyl chloride.

Preferably, from 0.05 to 20% by weight, particularly preferably from 1 to 10% by weight, based on the total weight of the monomers, of one or more functional comonomers are also copolymerized. Examples of functional comonomers are ethylenically unsaturated mono- and di-carboxylic acids, preferably acrylic acid, methacrylic acid, fumaric acid and maleic acid, as well as maleic anhydride; ethylenically unsaturated carboxylic acid amides and nitriles, preferably acrylamide and acrylonitrile; ethylenically unsaturated sulfonic acids and salts thereof, preferably vinylsulfonic acid, 2-acrylamido-2-methyl-propanesulfonic acid. Examples of functional comonomers are also epoxyfunctional comonomers such as glycidyl methacrylate and glycidyl acrylate. Further examples of functional comonomers are silicone-functional comonomers, such as acryloxypropyltri(alkoxy)- and methacryloxypropyltri(alkoxy)-silanes, wherein there may be present as alkoxy groups, for example, methoxy, ethoxy and ethoxy-propylene glycol ether radicals, such as methacryloxypropyltrimethoxysilane, vinyltrialkoxyslianes and vinylmethyldialkoxysilanes such as vinyltrimethoxysilane or vinyltriethoxysilane or vinylmethyldimethoxysilane. There may be mentioned as examples of functional comonomers also monomers having hydroxy groups, for example methacrylic acid hydroxyalkyl esters and acrylic acid hydroxyalkyl esters such as hydroxyethyl or hydroxypropyl or hydroxybutyl acrylate or methacrylate. Preference is given to ethylenically unsaturated mono- and di-carboxylic acids and silicon-functional comonomers.

Preferred organic polymers are the polymerizates of vinyl esters, in particular vinyl acetate, with from 3 to 12% by weight of ethylenically unsaturated carboxylic acids, such as acrylic acid or methacrylic acid, and optionally from 0.1 to 3% by weight of ethylenically unsaturated silanes, such as vinyltrimethoxysilane, vinyltriethoxysilane, vinylmethyldimethoxysilane or vinylmethyldiethoxysilane;

the polmerizates of vinyl esters, in particular vinyl acetate, with from 0.1 to 3% by weight of ethylenically unsaturated silanes, such as vinyltrimethoxysilane, vinyltriethoxysilane, vinylmethyldimethoxysilane or vinylmethyldiethoxysilane, wherein the polymerizates can in each case also comprise from 5 to 45% by weight of one or more monomer units from the group comprising vinyl esters, other than the copolymerized vinyl esters, of unbranched or branched alkylcarboxylic acids having from 3 to 15 carbon atoms, methacrylic acid esters and acrylic acid esters of alcohols having from 1 to 15 carbon atoms, styrene, ethylene, butadiene and vinyl chloride, and wherein the amounts in % by weight in each case add up to 100% by weight.

Preferred organic polymers are also the polymerizates of (meth)acrylic acid esters of alcohols having from 1 to 15 carbon atoms, such as methyl (meth)acrylate and/or n-butyl (meth)acrylate, with from 3 to 12% by weight of ethylenically unsaturated carboxylic acids, such as acrylic acid or methacrylic acid, and optionally from 0.1 to 3% by weight of ethylenically unsaturated silanes, such as vinyltrimethoxysilane, vinyltriethoxysilane, vinylmethyldimethoxysilane or vinylmethyldiethoxysilane, and optionally from 0.1 to 50% by weight, preferably from 5 to 30% by weight, styrene; the polymerizates of (meth)acrylic acid esters of alcohols having from 1 to 15 carbon atoms, such as methyl (meth)acrylate and/or n-butyl (meth)acrylate, with from 0.1 to 3% by weight of ethylenically unsaturated silanes, such as vinyltrimethoxysilane, vinyltriethoxysilane, vinylmethyldimethoxysilane or vinylmethyldiethoxysilane, and optionally from 0.1 to 50% by weight, preferably from 5 to 30% by weight, styrene;

wherein the amounts in % by weight in each case add up to 100% by weight.

The organic polymers can be prepared by means of polymerization processes known to the person skilled in the art: the suspension or mini-emulsion or preferably the emulsion polymerization process, as described, for example, in Encyclopedia of Polymer Science and Engineering, Vol. 8, pages 659 to 677, John Wiley and Sons, Inc., 1987 or in DE 10 2006 050 336 A1. The ethylenically unsaturated monomers are thereby polymerized in the aqueous medium in the presence of emulsifier and/or protective colloid by means of radically initiated polymerization.

The choice of monomers, or the choice of the amounts by weight of the comonomers, is such that, generally, a glass transition temperature Tg of from $-50°$ C. to $+50°$ C. is obtained. The glass transition temperature Tg of the polymerizates can be determined in known manner by means of DSC (differential scanning calorimetry, DIN SN ISO 11357-1/2), for example using a differential scanning calorimeter DSC1 from Mettler-Toledo in an open crucible at a heating rate of 10 K/min. The temperature at the midpoint of the step (midpoint=half the step height of the step of the heat flow) of the second heating curve is evaluated as the glass transition temperature in the heat flow diagram. The Tg can also be predicted approximately by means of the Fox equation. According to Fox T. G., Bull. Am. Physics Soc. 1, 3, page 123 (1956): $1/Tg=x1/Tg1+x2/Tg2+ \ldots +xn/Tgn$, where xn represents the mass fraction (% by weight/100) of the monomer n, and Tgn is the glass transition temperature in kelvins of the homopolymer of the monomer n. Tg values for homopolymerizates are listed in Polymer Handbook 2nd Edition, J. Wiley & Sons, New York (1975).

The preparation of the composite particles comprising an organic polymer and finely divided, inorganic solid particles can be carried out by means of the processes mentioned above as prior art. The finely divided, inorganic solid particles are thereby preferably used in the form of a stable, aqueous solid dispersion. Preferably, an aqueous dispersion comprising the finely divided, inorganic solids is added during the polymerization in the preparation of the organic polymer or is added to the finished polymer dispersion.

Preference is also given to a process in which an aqueous dispersion of the finely divided, inorganic solids is mixed with a polymer dispersion of polymerizates which comprise functional groups, for example silane groups and/or carboxyl groups, so that chemical or physical bonding can take place between the inorganic and the organic particles.

Preference is likewise given to a process in which an aqueous dispersion comprising finely divided, inorganic solids is mixed with an aqueous polymer dispersion, the polymer of which can optionally comprise functional groups such as silane groups and/or carboxyl groups, and with an epoxysilane compound, for example 3-glycidoxypropyltrimethoxysilane or 3-glycidoxypropylmethyldiethoxysilane. The mentioned mixing operations are carried out preferably at a temperature of from 20 to 70° C. over a period of preferably from 1 to 12 hours.

The composite particles have at least in part a core-shell structure. The inorganic particles therein form a core and the polymer chains form a shell. The amount by weight of inorganic solid in the composite particles is from 15 to 45% by weight, based on the total weight of organic polymer and inorganic solid in the composite particle.

The composite particles so obtainable are generally in the form of an aqueous dispersion, preferably with a solids content of from 40 to 70%, particularly preferably from 45 to 65% and most preferably from 50 to 60%. The dispersions of the composite particles preferably have a viscosity of from 65 to 300 mPas and particularly preferably from 75 to 2000 mPas, in particular between 80 and 900 mPas (Brookfield viscosity at 25° C. as a 50% dispersion in water and 20 rpm). The particle size of the composite particles is between 5 and 5000 nm. The preferred particle size is between 50 and 500 nm. The particle size is in each case the weight-average particle size dw, determined by means of statistical light scattering measurement, for example using a Nanosizer from Coulter.

For the preparation of the composite particles in the form of powders, the dispersions of the modified composite particles can be spray-dried, optionally with the addition of protective colloids as drying aid. Preferably, polyvinyl alcohols are used as drying aid. Spray drying is thereby carried out in conventional spray drying installations, wherein atomization can take place by means of one-, two- or multi-component nozzles or using a rotary disk. The outlet temperature is generally chosen in the range from 45° C. to 120° C., preferably between 60° C. and 90° C. In order to improve the blocking stability, the powder thereby obtained can be provided with an anti-blocking agent (anti-caking agent). Examples of anti-blocking agents are calcium carbonate, talc, silicas, kaolins.

The composite particles in the form of powders so obtained can be brought into the desired form by subsequent grinding and/or redispersion in water, organic solvents or reactive diluents.

The external thermal, insulation composite system is based on an insulating layer, generally insulation boards laid close together, with the avoidance of gaps, which are fixed to the exterior façade of a building (building wall) in a manner known to the person skilled in the art by means of an adhesive mortar and/or by means of mechanical holding elements.

The insulation boards are generally based on organic or inorganic, natural or synthetic insulating materials. Examples of synthetic insulating materials are plastics materials, such as polystyrene, in particular expanded or extruded polystyrene, or polyurethane, in particular polyurethane foams, mineral materials, in particular mineral fibers, mineral wool or mineral foams. Examples of natural, inorganic insulating materials are porous materials bonded with lime or cement. Examples of natural, organic insulating materials are boards made of wood fibers, wood wool, grasses or stalks, which are generally bonded with mineral or organic binders. The production of the insulation boards is known to the person skilled in the art.

The finishing layer is formed by applying an aqueous mortar composition. The mortar composition for the finishing layer comprises as dry constituents one or more mineral binders, optionally one or more polymeric binders, one or more fillers and optionally further additives.

Suitable mineral binders are, for example, cements, in particular Portland cement, aluminate cement, magnesia cement, slag cement, as well as mixed cements, puzzolans, lime and gypsum.

Suitable polymeric binders are vinyl ester polymerizates such as vinyl acetate-ethylene polymerizates or (meth) acrylic acid ester polymerizates, styrene-acrylic acid ester polymerizates or styrene-butadiene polymerizates, which are used for producing the mortar composition in the form of their aqueous polymer dispersions or in the form of their water-dispersible polymer powders.

Examples of suitable fillers are quartz sand, calcium carbonate, dolomite, aluminum silicates, clay, chalk, white hydrated lime, talcum or mica, or also lightweight fillers such as pumice, foam glass, gas concrete, perlite, vermiculite, carbon nanotubes (CNT). Any desired mixtures of the mentioned fillers can also be used. Preference is given to quartz sand, quartz flour, calcium carbonate, chalk or white hydrated lime.

Further conventional additives for the mortar compositions are thickeners, for example polysaccharides such as cellulose ethers and modified cellulose ethers, starch ethers, layered silicates, polycarboxylic acids such as polyacrylic acid and partial esters thereof, as well as polyvinyl alcohols which may optionally be acetalized or hydrophobically modified, casein and thickeners having an associative action. Conventional additives are also retarding agents, such as hydroxycarboxylic acids, or dicarboxylic acids or salts thereof, saccharides, oxalic acid, succinic acid, tartaric acid, gluconic acid, citric acid, sucrose, glucose, fructose, sorbitol, pentaerythritol. A conventional additive are setting accelerators, for example alkali or alkaline earth salts of inorganic or organic acids. In addition, there may also be mentioned: hydrophobizing agents, preservatives, film-forming aids, dispersing agents, foam stabilizers, antifoams and flame retardants (e.g. aluminum hydroxide). The additives are used in the amounts conventional therefor, which are dependent, on the nature of the additive.

In general, the mortar compositions for the finishing layer comprise from 10 to 50% by weight mineral binders, from 0 to 10% by weight polymeric binders, from 40 to 80% by weight fillers, from 0.1 to 10% by weight additives, as well as preferably from 5 to 20% by weight composite particles, in each case based on the total weight of the dry composition without water, and wherein the amounts in % by weight in each case add up to 100% by weight. The amount of composite particles in the finishing layer, based on the total weight of the finishing layer, thereby corresponds to the amount of composite particles in the dry composition of the mortar.

If a reinforcing layer is applied, the composition thereof can correspond to that of the finishing layer, except for the amount of composite particles. In general, the mortar compositions for the reinforcing layer comprise from 10 to 50% by weight mineral binders, from 0 to 10% by weight polymeric binders, from 40 to 80% by weight fillers, optionally from 0.1 to 10% by weight additives, in each case based on the total weight of the dry composition without water, and wherein the amounts in % by weight in each case add up to 100% by weight. A woven fabric, preferably a glass fiber fabric, is generally inserted into the reinforcing layer.

The examples which follow serve to explain the invention further:

Binder Dispersions:

Comparative Dispersion 1:

Aqueous vinyl chloride copolymer dispersion stabilized with emulsifier, having a solids content of 57.7% by weight and produced by means of emulsion polymerization of 76% by weight vinyl chloride, 6.2% by weight vinyl laurate, 17.4% by weight ethylene and 0.4% by weight glycidyl methacrylate.

Composite Dispersion 2:

1098 g of comparative dispersion 1 were mixed together with 869.6 g of silica sol (solids content 41%, Bindzil 2040 from Akzo Nobel) and 31 g of 3-glycidoxypropyltrimethoxysilane (Geniosil GF 80, WACKER Chemie) in a reactor and stirred for five hours at 40° C.

A composite dispersion having a solids content of 51% by weight, was obtained. The silica content of the composite dispersion was 34% by weight, based on the total solids content.

Comparative Dispersion 3:

Aqueous copolymer dispersion stabilised with emulsifier, having a solids content of 44.7% by weight and produced by means of polymerization of 59.5% by weight, butyl acrylate, 24% by weight, methyl methacrylate, 11% by weight styrene, 5% by weight methacrylic acid and 0.5% by weight vinyltriethoxysilane.

Composite Dispersion 4:

2000 g of comparative dispersion 3 were mixed with 394.5 g of silica sol (Bindzil 2040) in a reactor and stirred for three hours at 60° C. After cooling, a composite dispersion having a solids content of 43.9% by weight was obtained. The silica content, based on the total solids content, was 15% by weight.

Composite Dispersion 5:

1388.6 g of comparative dispersion 3 were mixed with 911.4 g of silica sol (Bindzil 2040) in a reactor and stirred for three hours at 60° C. After cooling, a composite dispersion having a solids content of 42.8% by weight was obtained. The silica content, based on the total solids content, was 37% by weight.

Comparative Dispersion 6:

1200.6 g of comparative dispersion 3 were mixed with 1098 g of silica sol (Bindzil 2040) in a reactor and stirred for three hours at 60° C.

After cooling, a composite dispersion having a solids content of 42.5% by weight was obtained. The silica content, based on the total solids content, was 4% by weight.

Production of the external thermal insulation composite systems (ETICS test specimens):

An external thermal insulation composite system was in each case constructed on a cement-bonded calcium silicate fire protection board (Promatec H from Promat AG) as the base board, of dimensions 150 mm×100 mm and having a thickness of 12 mm.

An adhesive mortar composition was applied to the base board in a layer thickness of 4 mm, and in each case a polystyrene insulation board (Isover EPS façade insulation board 040 WDV from Saint Gobain) of dimensions 100 cm×50 cm and having a thickness of 7 cm was placed on the adhesive mortar layer and pressed down.

The reinforcing mortar was then applied to the polystyrene insulation board in a layer thickness of 4 mm, and a glass fiber fabric (ETICS glass fiber fabric having a weight per unit area of 165 g/m$^2$, mesh size 4 mm×4 mm, white) was placed on the render layer.

Finally, a finishing render mortar was in each case applied to the reinforcing layer in a layer thickness of 4 mm.

The adhesive mortar and the reinforcing mortar each had the composition indicated in Table 1.

TABLE 1

148.8 g of cement (white cement CEM I 42.5 R from Dyckerhoff)
16.5 g of hydrated lime (Edelhydrat CL 90-S from Walhalla Kalk)
206.6 g of limestone (Juraperle MHS from Omya)
403.3 g of sand (quartz sand HR 81T from Quarzwerke)
49.6 g of dispersible powder (Vinnapas 5044N from Wacker Chemie)
1.2 g of cellulose ether (Tylose MB 15009 P2 from ShinEtsu)
174.0 g of water The finishing render mortar in each case had the composition indicated in Table 2.

TABLE 2

| Finishing render formulations | Comparative render 1 | Finishing render 2 | Comparative render 3 | Finishing render 4 | Finishing render 5 | Comparative render 6 |
|---|---|---|---|---|---|---|
| CaCO$_3$ filler (Calcilit 100, Alpha Calcit Füllstoff) | 360 | 360 | 360 | 360 | 360 | 360 |
| CaCO$_3$ filler (Calcilit 1.5-2.0 mm, Alpha Calcit Füllstoff) | 320 | 320 | 320 | 320 | 320 | 320 |

TABLE 2-continued

| Finishing render formulations | Comparative render 1 | Finishing render 2 | Comparative render 3 | Finishing render 4 | Finishing render 5 | Comparative render 6 |
|---|---|---|---|---|---|---|
| Kieselguhr filler (Celite 281, Imerys Minerals) | 40 | 40 | 40 | 40 | 40 | 40 |
| Comparative dispersion 1 | 110.6 | | | | | |
| Composite dispersion 2 | | 125.1 | | | | |
| Comparative dispersion 3 | | | 142.8 | | | |
| Composite dispersion 4 | | | | 145.4 | | |
| Composite dispersion 5 | | | | | 149.1 | |
| Comparative dispersion 6 | | | | | | 150.2 |
| Preservative (Parmetol A 26, Schülke&Mayr) | 2 | 2 | 2 | 2 | 2 | 2 |
| Rheological additive (Bentone EW, Elementis) | 0.8 | 0.8 | 0.8 | 2.0 | 2.5 | 3.0 |
| Thickener (Tylose MH1000KG4, ShinEtsu) | 0.6 | 0.6 | 0.6 | 0.6 | 0.6 | 0.6 |
| Cellulose fibers (Arbocel B 400, JRS) | 3.0 | 3.0 | 3.0 | 3.0 | 3.0 | 3.0 |
| Acrylic fibers (PAC hm 6.7/4 mm, Draton) | 2.0 | 2.0 | 2.0 | 2.0 | 2.0 | 2.0 |
| $TiO_2$ pigment (Kronos 2190, Kronos) | 20.0 | 20.0 | 20.0 | 20.0 | 20.0 | 20.0 |
| Sodium hydroxide solution 10% strength | 0.5 | 0.5 | 0.5 | 0.5 | 0.5 | 0.5 |
| Coalescing agent (Lusolvan FBH, BASF) | 3.0 | 5.0 | | | | |
| Antifoam (Agitan 260, Münzing Chemie GmbH) | 1.0 | 1.0 | 1.0 | 1.0 | 1.0 | 1.0 |
| Dispersing agent (Dispes N 40, BASF) | 2 | 2 | 2 | 2 | 2 | 2 |
| Water | 114.5 | 81.0 | 93.3 | 125.2 | 130.0 | 135.7 |
| Total | 980 | 964 | 988 | 1024 | 1029 | 1043 |

Test Methods:

The mechanical resilience of the external, thermal insulation composite systems was determined by means of the indentation test according to ST ISO 7892 (1 kg steel ball, deflection 1.02 m.).

The results are summarized in Table 3:

| | Indentation test (5x) | Indentation test |
|---|---|---|
| Comparative render 1 | + + + + + | 100% |
| Finishing render 2 | + + + + − | 80% |
| Comparative render 3 | + + + + + | 100% |
| Finishing render 4 | + + + + + | 100% |
| Finishing render 5 | + + + − + | 80% |
| Comparative render 6 | − + − − + | 40% |

The fire behavior was tested in accordance with DIN EN 13823 by the SBI test (single burning item) and classified according to DIN EN 13501-1.

The SBI test is a test method for testing the fire behavior of building materials. For that purpose, the test specimens were exposed to burning attack by a single burning item, a propane gas burner in a sand-box. The test specimen was positioned in a corner of a trolley and positioned beneath a smoke gas outlet. The reaction of the test specimen to flame impingement was recorded by instruments and visually, and the fire growth, smoke production and heat release were calculated from the measured values.

FIGRA [W/s]=fire growth rate

In the case of the FIGRA value (fire growth rate), the fire growth rate in W/s is determined.

$THR_{600}$[MJ]=heat release after 10 min

With the $THR_{600}$ value (total heat release), the total heat release after 600 seconds is determined.

TSP(600)[$m^2$]=smoke production after 10 min:

The individual TSP (t) values (total smoke production, unit $m^2$) represent the total smoke production of the samples until the time t of measurement. A TSP (t) value corresponds to the sum of the individual SPRav (t) values in the time period from the start of measurement to time t. The individual $SPR_{av}$(t) values (smoke production rate, unit $m^2$/s) thereby represent the current smoke production of the samples at time t of measurement. A $SPR_{av}$ value represents the quotient of a smoke gas volume stream in $m^3$/s and the length in m of the light path through the tube of a photometric measuring device, which results in the unit $m^2$/s. A TSP value represents the product of a sum of SPRav values in $m^2$/s and the associated time period in s, which results in the unit $m^2$.

SMOGRA [$m^2/S^2$]=smoke growth rate index

The SMOGRA values (SMOke GRowth RAte index, unit $m^2/s^2$) represent the maxima of the quotients of the $SPR_{av}$(t) values of the samples and the associated times t of measurement. The SMOGRA value represents the quotient of a $SPR_{av}$ (t) value in $m^2$/s and the associated time t in s, which results in the unit $m^2/s^2$.

The results are summarized in Table 4:

| | FIGRA [W/s] | $THR_{600\,s}$ [MJ] | SMOGRA [$m^2/S^2$] | $TSP_{600\,s}$ [$m^2$] |
|---|---|---|---|---|
| Comparative render 1 | 57 | 2.3 | 18 | 66 |
| Finishing render 2 | 35 | 1.6 | 13 | 48 |
| Comparative render 3 | 62 | 2.9 | 9 | 87 |
| Finishing render 4 | 45 | 2.5 | 6 | 70 |
| Finishing render 5 | 35 | 2.2 | 4 | 50 |
| Comparative render 6 | 30 | 1.8 | 3 | 45 |

The results, compared with the comparative renders without composite particles, demonstrate good mechanical strength in the indentation test and reduced fire growth (FIGRA) and heat release (THR). The smoke production (TSR) is likewise lower, and the same is true of the smoke growth rate (SMOGRA).

The invention claimed is:

1. An external thermal insulation composite system comprising an insulating layer, optionally a reinforcing layer applied to the insulating layer, and a mortar composition finishing layer applied to the insulating layer or optionally to the reinforcing layer, wherein the mortar composition finishing layer comprises:

a) from 5-20 wt. % of composite particles, comprising at least one organic polymer which is a homopolymer or copolymer of ethylenically unsaturated monomers selected from the group consisting of vinyl esters of unbranched or branched alkylcarboxylic acids having from 1 to 15 carbon atoms, (meth)acrylic acid esters of alcohols having from 1 to 15 carbon atoms, vinyl aromatic compounds, olefins, dienes, vinyl halides and mixtures thereof, and from 0.05 to 20% by weight, based on the total weight of all monomers, of one or more functional comonomers selected from the group consisting of ethylenically unsaturated carboxylic acid amides and nitriles, ethylenically unsaturated sulfonic acids and salts thereof, epoxy-functional comonomers, silicon-functional comonomers, and mixtures thereof; and silicon dioxide particles having a weight-average particle size of 4-150 nm, wherein the amount by weight of inorganic solid is from 15 to 40% by weight, based on the total weight of organic polymer and inorganic solid in the composite particle;

b) up to 50 wt. % mineral binder(s) selected from the group consisting of cement, pozzolans, lime, gypsum, and mixtures thereof;

c) 40 to 80 wt. % fillers selected from the group consisting of quartz sand, calcium carbonate, dolomite, aluminum silicates, clay, chalk, white hydrated lime, talcum, mica, pumice, foam glass, gas concrete, perlite, vermiculite, carbon nanotubes (CNT), and mixtures thereof;

d) up to 10 wt. % of polymeric binders selected from the group consisting of vinyl ester polymerizates, (meth) acrylic acid ester polymerizates, styrene-acrylic acid ester polymerizates, styrene-butadiene polymerizates, and mixtures thereof; and e) 0.1 to 10 wt. % of further additives selected from the group consisting of thickeners, retarding agents, setting accelerators, hydrophobicizing agents, preservatives, film-forming aids, dispersing agents, foam stabilizers, antifoams, flame retardants, and mixtures thereof.

2. The external thermal insulation composite system of claim 1, wherein cement is present in the mortar composition of the finishing layer, and includes at least one of Portland cement, aluminate cement, magnesia cement, and slag cement.

3. The external thermal insulation composite system of claim 1, wherein the at least one organic polymer is a polymerizate of ethylenically unsaturated monomers selected from the group consisting of vinyl esters of unbranched or branched alkylcarboxylic acids having from 1 to 15 carbon atoms, methacrylic acid esters and acrylic acid esters of alcohols having from 1 to 15 carbon atoms, vinyl aromatic compounds, olefins, dienes or vinyl halides; and from 0.05 to 20% by weight, based on the total weight of the monomers, of one or more functional comonomers selected from the group consisting of ethylenically unsaturated mono- and di-carboxylic acids and silicon-functional comonomers.

4. The external thermal insulation composite system of claim 1, wherein the at least one organic polymer is a polymerizate of (meth)acrylic acid esters of alcohols having from 1 to 15 carbon atoms with from 3 to 12% by weight of ethylenically unsaturated carboxylic acids and optionally from 0.1 to 3% by weight of ethylenically unsaturated silanes and optionally from 0.1 to 50% by weight styrene, or a polymerizate of (meth)acrylic acid esters of alcohols having from 1 to 15 carbon atoms with from 0.1 to 3% by weight of ethylenically unsaturated silanes and optionally from 0.1 to 50% by weight styrene, wherein the amounts in % by weight in each case add up to 100% by weight based on the weight of the monomers.

5. The external thermal insulation composite system of claim 1, wherein the at least one organic polymer is a polymerizate of vinyl esters of unbranched or branched alkylcarboxylic acids having from 1 to 15 carbon atoms with from 3 to 12% by weight of ethylenically unsaturated carboxylic acids and optionally from 0.1 to 3% by weight of ethylenically unsaturated silanes, or polymerizate of vinyl ester(s) of unbranched or branched alkylcarboxylic acids having from 1 to 15 carbon atoms with from 0.1 to 3% by weight of ethylenically unsaturated silanes, wherein the polymerizates optionally comprise from 5 to 45% by weight of one or more monomer units from the group consisting of vinyl esters other than the copolymerized vinyl esters, of unbranched or branched alkylcarboxylic acids having from 3 to 15 carbon atoms, methacrylic acid esters, and acrylic acid esters of alcohols having from 1 to 15 carbon atoms, styrene, ethylene, butadiene or vinyl chloride, and wherein the amounts in % by weight in each case add up to 100% by weight.

6. A method for thermally insulating exterior façades of buildings comprising:

fixing an external thermal insulation composite system as claimed in claim 1 to the exterior façade of a building.

7. The method of claim 6, wherein the fixing is carried out by an adhesive mortar and/or mechanical holding elements.

8. The external thermal insulation system of claim 1, wherein the finishing layer composition provides fire resistance and impact resistance.

9. The external thermal insulation system of claim 1, wherein the composite particles comprise a phase of organic polymer, the inorganic solid is distributed in the phase of organic polymer, and wherein the inorganic solid is linked to the organic polymer via physical and/or chemical bonds.

10. The external thermal insulation system of claim 1, wherein the composite particles have a core-shell structure, wherein inorganic solids form the core and organic polymers form the shell.

11. The external thermal insulation system of claim 1, wherein the finishing layer is a mortar composition comprising from 10 to 50% by weight mineral binders, 0 to 10 weight percent polymeric binders, 40 to 80% by weight fillers, from 5 to 20% by weight of composite particles, and from 0.1 to 10 wt. percent of further additives, the weight percentages being based on the weight of the dry composition, and totaling 100%.

* * * * *